United States Patent
Shinohara

(10) Patent No.: US 8,314,528 B2
(45) Date of Patent: Nov. 20, 2012

(54) MOTOR

(75) Inventor: Toshinobu Shinohara, Kyoto (JP)

(73) Assignee: Nidec Corporation, Kyoto (JP)

( * ) Notice: Subject to any disclaimer, the term of this patent is extended or adjusted under 35 U.S.C. 154(b) by 193 days.

(21) Appl. No.: 12/999,344

(22) PCT Filed: Jun. 16, 2009

(86) PCT No.: PCT/JP2009/060945
§ 371 (c)(1),
(2), (4) Date: Dec. 16, 2010

(87) PCT Pub. No.: WO2009/154198
PCT Pub. Date: Dec. 23, 2009

(65) Prior Publication Data
US 2011/0084562 A1   Apr. 14, 2011

(30) Foreign Application Priority Data
Jun. 17, 2008   (JP) .................................. 2008-157483

(51) Int. Cl.
*H02K 3/00* (2006.01)
*H02K 1/00* (2006.01)
*H02K 21/00* (2006.01)
*H02K 19/26* (2006.01)
*H02K 23/40* (2006.01)

(52) U.S. Cl. ............................ 310/194; 310/71; 310/214

(58) Field of Classification Search .................. 310/194, 310/71, 214; *H02K 1/00, 3/00, 21/00, 19/26, H02K 23/40*
See application file for complete search history.

(56) References Cited

U.S. PATENT DOCUMENTS

| 7,557,478 | B2 | 7/2009 | Hoshika |
| 7,569,964 | B2 * | 8/2009 | Ijima ............................... 310/194 |
| 7,595,572 | B2 | 9/2009 | Haga et al. |
| 7,663,287 | B2 | 2/2010 | Haga et al. |
| 2003/0011271 | A1 * | 1/2003 | Takano et al. ................. 310/254 |

(Continued)

FOREIGN PATENT DOCUMENTS

JP   6-13361 U   2/1994
(Continued)

OTHER PUBLICATIONS

International Preliminary Report on Patentability issued in International Patent Application No. PCT/JP2009/060945, mailed on Dec. 29, 2010 and Feb. 8, 2011.

(Continued)

*Primary Examiner* — Quyen Leung
*Assistant Examiner* — Terrance Kenerly
(74) *Attorney, Agent, or Firm* — Keating & Bennett, LLP

(57) ABSTRACT

An armature includes an insulator component with a wiring member arranged in a wiring fixing groove positioned outside of an outer wall portion of the insulator component. When a lead wire is wound around the insulator component, a winding start portion and a winding end portion of the lead wire are arranged to intersect with each other in a radial direction to define an intersection portion. The winding start portion is pressed by the winding end portion toward the outer wall portion. A lead wire escape portion spaced from a radially outer end portion of a coil is defined in the outer wall portion. This contributes to preventing the outer wall portion from being deformed by being pressed by the lead wire at the intersection portion, thereby preventing difficulty in arranging the wiring member on the insulator component.

6 Claims, 8 Drawing Sheets

U.S. PATENT DOCUMENTS

| | | | |
|---|---|---|---|
| 2006/0043806 A1* | 3/2006 | Torii et al. | 310/71 |
| 2007/0085531 A1* | 4/2007 | Ijima | 324/207.25 |
| 2007/0222324 A1* | 9/2007 | Fukui et al. | 310/215 |
| 2008/0024029 A1* | 1/2008 | Shiono et al. | 310/194 |

FOREIGN PATENT DOCUMENTS

| | | |
|---|---|---|
| JP | 10-174378 A | 6/1998 |
| JP | 2007-68314 A | 3/2007 |
| JP | 2007-267569 A | 10/2007 |
| JP | 2007-325481 A | 12/2007 |
| JP | 2007-325482 A | 12/2007 |

OTHER PUBLICATIONS

Official Communication issued in International Patent Application No. PCT/JP2009/060945, mailed on Aug. 18, 2009.

* cited by examiner

A—A

MOTOR

BACKGROUND OF THE INVENTION

1. Field of the Invention

The present invention relates to an electric motor.

2. Description of the Related Art

In conventional electric motors, wiring members are typically arranged on an insulator covering teeth of an armature. These wiring members are arranged to connect coils with one another or connect the coils with an external power supply.

JP-A 2007-325481 discloses an example of a conventional inner-rotor brushless motor in which a stator core is covered with an insulator. A positioning recessed portion is defined in an inside surface of an outside wall, which is positioned above the insulator and radially outward of a coil. The positioning of the recessed portion is arranged to extend upward in an axial direction. When a lead wire is wound around the stator core to define the coil, a winding start portion of the lead wire is pulled upward and radially outward to be positioned within the positioning recessed portion, whereby a position at which the winding of the lead wire is started is fixed.

However, in the case of an armature in which a wiring member is arranged radially outward of a wall portion of an insulator, if a winding start portion and a winding end portion of a lead wire to define a coil are arranged to intersect with each other in a radial direction, an intersection portion of the lead wire will be brought into contact with the wall portion of the insulator. This contact may cause the wall portion to be pressed radially outward to undergo deformation, making it difficult to arrange the wiring member on the insulator.

SUMMARY OF THE INVENTION

A motor according to preferred embodiments of the present invention preferably includes a stator portion, a rotor portion, and a bearing mechanism. The stator portion includes an annular armature. The armature includes a core including a plurality of teeth, an insulator, a plurality of coils, and a wiring member. With respect to at least one of the teeth, a winding start portion and a winding end portion of a lead wire which defines the coil are arranged to intersect with each other in a radial direction to define an intersection portion. The insulator includes a wall portion arranged in contact with a radially outer end of the coil. The intersection portion and the wall portion are arranged to overlap with each other in the radial direction, while the wiring member is arranged in contact with an outside of the wall portion. The wall portion includes a lead wire escape portion spaced radially outward from the coil and arranged at a position where the wall portion and the intersection portion overlap with each other in the radial direction.

According to the preferred embodiments of the present invention, the intersection portion of the lead wire is prevented from deforming the wall portion to thereby prevent any difficulty in arranging the wiring member on the insulator.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
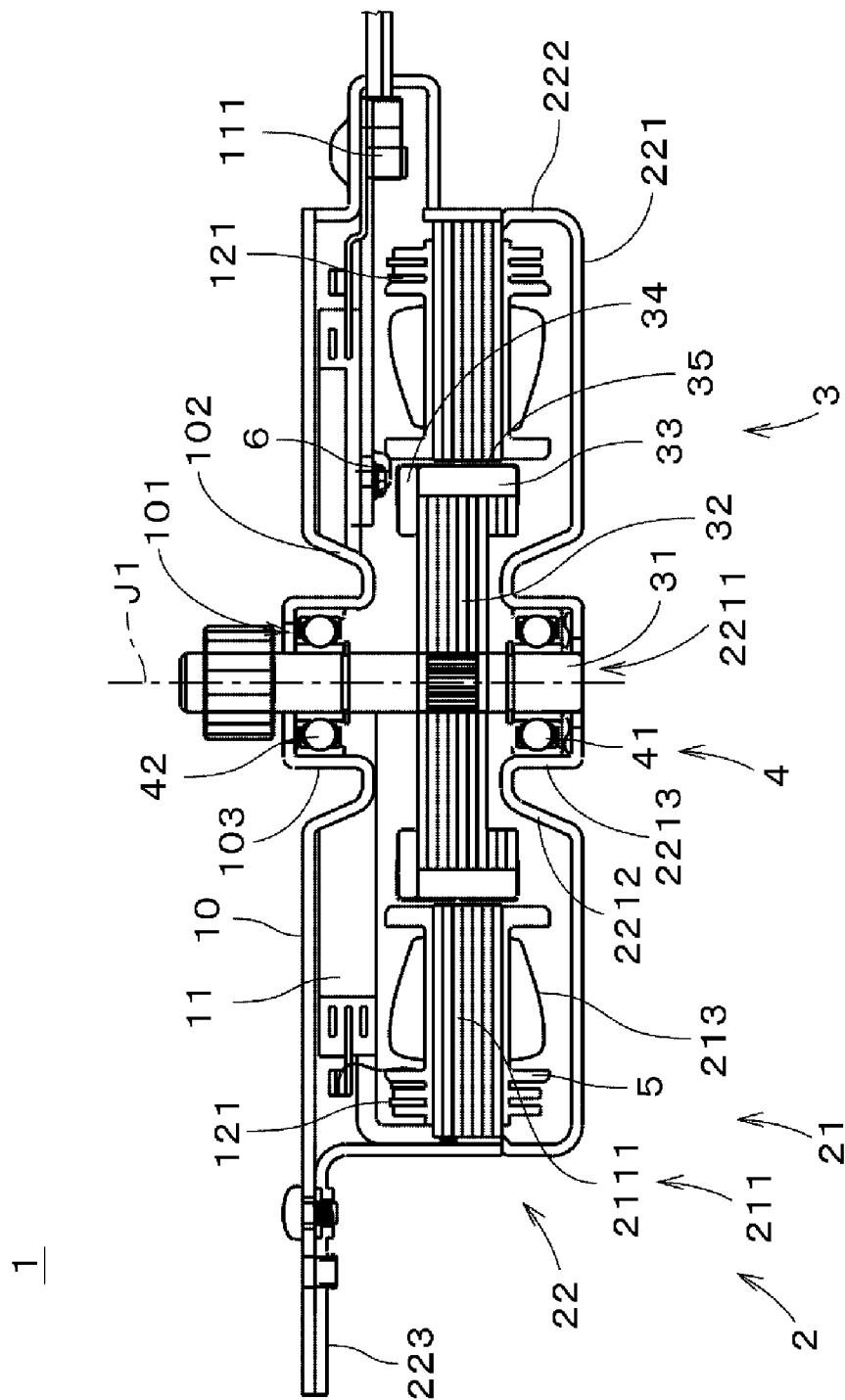
FIG. 1 is a schematic cross-sectional view of a motor according to a preferred embodiment of the present invention.

Hereinafter, preferred embodiments of the present invention will be described with reference to the accompanying drawings. FIG. 1 is a schematic diagram illustrating an electric motor 1 according to a preferred embodiment of the present invention. In FIG. 1, some of the components that are arranged beyond a cross section are also shown for the sake of clarity. The motor 1 of the preferred embodiment shown in FIG. 1 preferably is a thin type, whose height measured in a direction along a central axis J1 is smaller than the outside diameter thereof. As illustrated in FIG. 1, the motor 1 is an inner-rotor motor. The motor 1 preferably includes a stator portion 2, a rotor portion 3, a bearing mechanism 4, a sensor portion 6, a top cover 10, and a busbar unit 11. The stator portion 2 includes an armature 21, which is substantially in an annular shape centered on the central axis J1. The rotor portion 3 is inserted inside the armature 21. The bearing mechanism 4 is arranged to support the rotor portion 3 such that the rotor portion 3 is rotatable about the central axis J1 with respect to the stator portion 2. The sensor portion 6 is arranged to detect a rotational position of the rotor portion 3. The top cover 10 is arranged to cover an upper surface of the stator portion 2. The busbar unit 11 is arranged above the armature 21.

The rotor portion 3 preferably includes a substantially columnar shaft 31, a substantially cylindrical rotor core 32, a substantially annular field magnet 33, a sensor-use magnet 34 arranged to be used in detecting the rotational position of the rotor portion 3, and a rotor cover 35. The rotor core 32 is preferably defined by laminated metal sheets, but any other desirable type of rotor core could be used. The field magnet 33 is arranged on an outside surface of the rotor core 32 to be opposed to an inner circumference of the armature 21. The sensor-use magnet 34 is preferably arranged on an upper surface of the rotor core 32. The rotor cover 35 is arranged to cover the both field magnet 33 and the sensor-use magnet 34. The stator portion 2 includes the armature 21 and a stator cover 22, which has a bottom and is substantially cylindrical, and which is arranged to cover the armature 21. The armature 21 is accommodated in a space surrounded by the stator cover 22 and the top cover 10. In the following description, it is assumed for the sake of convenience that an upper side and a lower side are, respectively, provided on a side on which the top cover 10 is arranged and a side on which the stator cover 22 is arranged relative to each other along the central axis J1. Note, however, that the central axis J1 may not necessarily required to extend along the direction of gravity.

The armature 21 preferably includes a core 211, an insulator 5, coils 213, and a plurality of wiring members 121. The core 211 is defined by laminated silicon steel sheets, and includes a plurality of teeth 2111. However, any other desirable type of stator could be used instead. The insulator 5 is arranged to cover the teeth 2111. Each coil 213 is defined by a lead wire wound around a separate one of the teeth 2111 with the insulator 5 therebetween. The wiring members 121 are arranged on the insulator 5, and connected with the lead wire. The busbar unit 11, which is arranged above an upper surface of the armature 21, serves as a path through which drive currents are supplied to the armature 21, and is connected to an external power supply through a connector portion 111, which is arranged to protrude outward from the stator cover 22.

The bearing mechanism 4 includes a pair of bearings 41 and 42 arranged along the central axis J1. The bearings 41 and are supported by a bearing support portion 2213, which is provided in a substantial center of the stator cover 22, and a bearing support portion 103, which is provided in a substantial center of the top cover 10, respectively. The sensor portion 6 preferably includes a circuit board and a sensor, such as, for example, a magnetic field detecting Hall element. The sensor is arranged to be opposed to the sensor-use magnet 34, which is attached to the rotor portion 3. The sensor portion 6 is arranged to detect the rotational position of the rotor portion 3 with respect to the armature 21 through a detection of the magnetic field provided by the sensor-use magnet 34.

Figure 2:
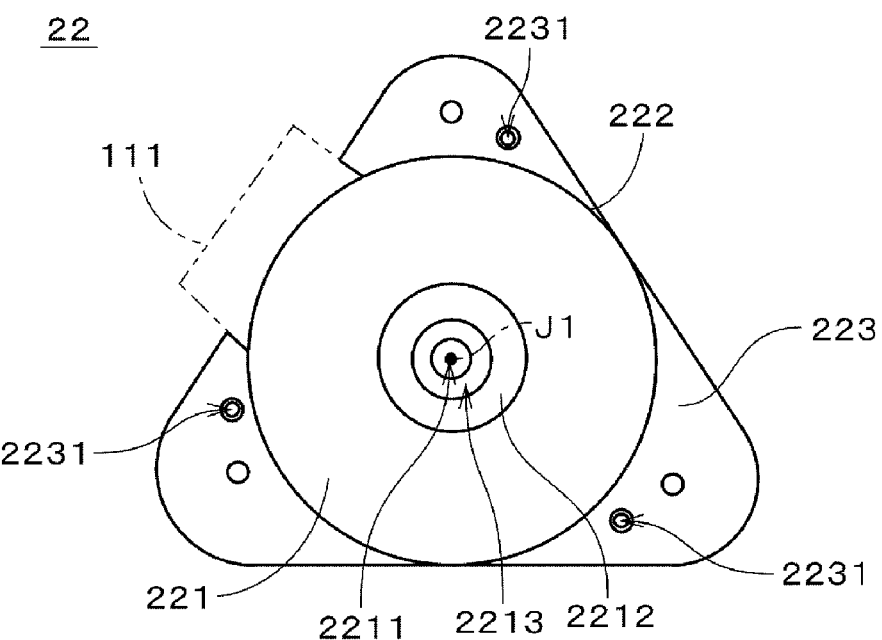
FIG. 2 is a schematic bottom view of a stator cover according to a preferred embodiment of the present invention.

FIG. 2 is a schematic bottom view of the stator cover 22. As illustrated in FIGS. 1 and 2, the stator cover 22 preferably includes a substantially disc-shaped bottom portion 221, a substantially cylindrical side wall portion 222, and a substantially triangular flange portion 223. The bottom portion 221 has, in a substantial center thereof, a hole portion 2211 inside which the shaft 31 is inserted, and an annular raised portion 2212 centering on the central axis J1 and arranged to protrude upward around the hole portion 2211. The bearing support portion 2213, which is arranged to support the bearing 41, is defined inside the annular raised portion 2212. The side wall portion 222 is arranged to extend upward from an outer edge of the bottom portion 221. The flange portion 223 is arranged to spread from an upper end of the side wall portion 222 in directions perpendicular or substantially perpendicular to the central axis J1. Three corner portions of the flange portion 223 each include a hole portion 2231 arranged to join the stator cover 22 to the top cover 10. A portion of the flange portion 223 and a corresponding portion of the side wall portion 222 are both cut out where the connector portion 111 is arranged.

Figure 3:
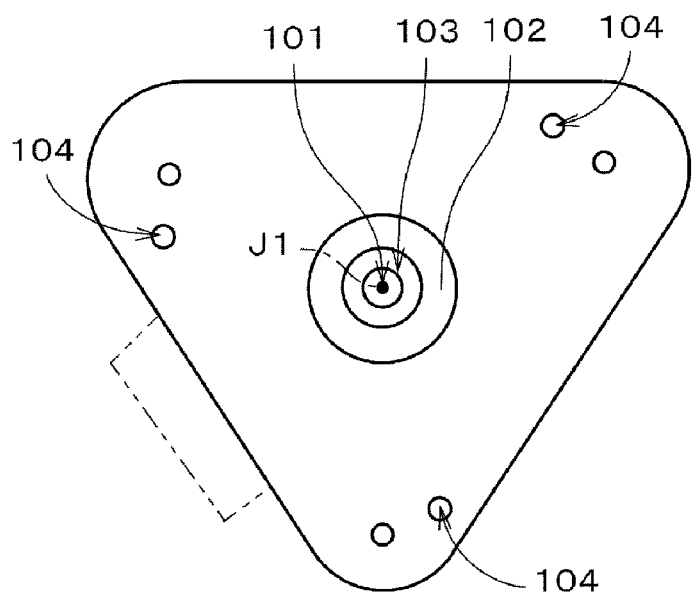
FIG. 3 is a schematic plan view of a top cover according to a preferred embodiment of the present invention.

FIG. 3 is a schematic plan view of the top cover 10. The top cover 10 is preferably substantially triangular, similarly to the flange portion 223, and includes three hole portions 104 defined at positions corresponding to those of the hole portions 2231 in the stator cover 22. In addition, as illustrated in FIGS. 1 and 3, the top cover 10 has, in a substantial center thereof, a hole portion 101 inside which the shaft 31 is inserted, and an annular raised portion 102 centering on the central axis J1 and arranged to protrude downward around the hole portion 101. The bearing support portion 103, which is arranged to support the bearing 42, is defined inside the annular raised portion 102.

Figure 4:
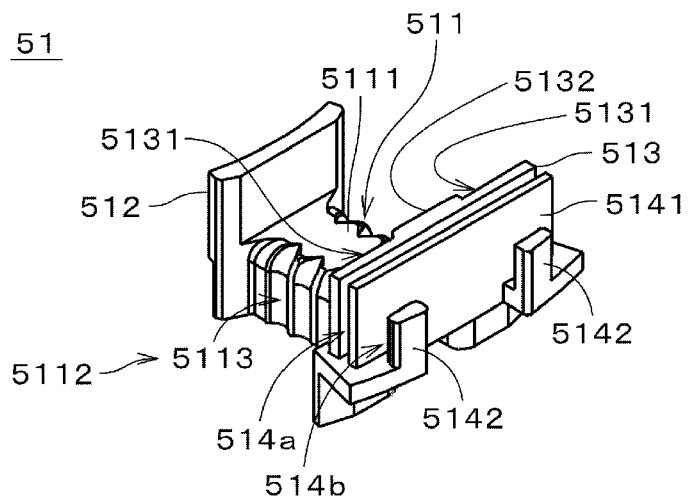
FIG. 4 is a schematic perspective view of an insulator component according to a preferred embodiment of the present invention.
Figure 5:
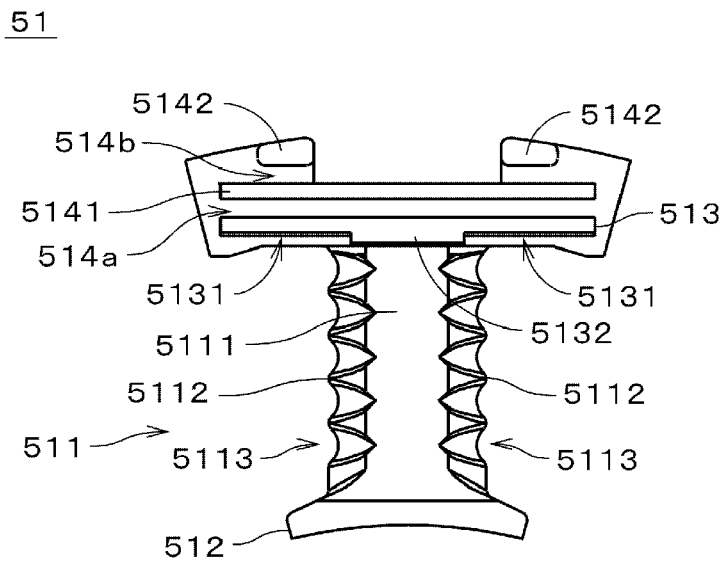
FIG. 5 is a schematic plan view of the insulator component according to a preferred embodiment of the present invention.
Figure 6:
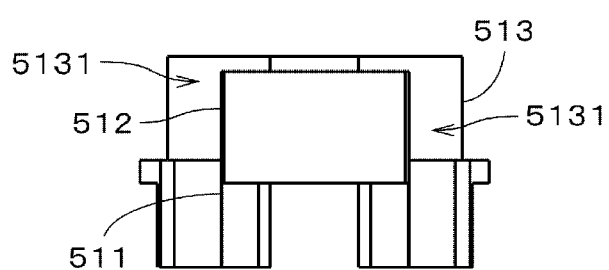
FIG. 6 is a schematic front view of the insulator component according to a preferred embodiment of the present invention.

The insulator 5 is defined by a circumferential array of combined pairs of upper and lower insulator components arranged in opposite orientations. FIGS. 4, 5, 6, and 7 are a schematic perspective view, a schematic plan view, a schematic front view, and a schematic rear view of the insulator component 51, respectively. The insulator component 51 arranged on an upper side of the tooth 2111 will now be described below. Note that the insulator component 51 arranged on a lower side of the tooth 2111 is similar to the insulator component 51 arranged on the upper side thereof, except that they are arranged in opposite orientations. As illustrated in FIGS. 4 to 6, the insulator component 51, which is preferably made of an electrically insulating resin material, includes a bottom portion 511 arranged to cover an upper portion and side portions of the tooth 2111, an inner wall portion 512 positioned radially inward of the tooth 2111, and an outer wall portion 513 positioned radially outward of the tooth 2111.

The inner wall portion 512 is substantially in the shape of a portion of a cylinder centered on the central axis J1, and is arranged to protrude upwardly and parallel or substantially parallel to the central axis J1. The outer wall portion 513 is preferably in the shape of a flat plate extending substantially in a circumferential direction, and is arranged to protrude upward parallel or substantially parallel to the central axis J1. The bottom portion 511 includes an upper portion 5111, which is a surface substantially perpendicular to the central axis J1, and side portions 5112 arranged to extend downward from both circumferential ends of the upper portion 5111. A plurality of guide grooves 5113, which serve as guides when the lead wire is wound around the tooth 2111, are defined in each side portion 5112 to extend parallel or substantially parallel to the central axis J1.

A portion of the outer wall portion 513 which is positioned above the bottom portion 511 includes a middle portion 5132 having a surface facing the central axis J1, and portions 5131 which are positioned on both sides of the middle portion 5132 substantially in the circumferential direction. The middle portion 5132 is arranged to protrude in the direction of the central axis J1 relative to the portions 5131 on both sides thereof. In addition, portions of the outer wall portion 513 which are positioned on both sides of the bottom portion 511 are, like the middle portion 5132, positioned closer to the central axis J1 than the portions 5131 on both sides of the middle portion 5132. Therefore, end portions of the outer wall portion 513 on both sides substantially in the circumferential direction have a spaced-apart axially stepwise structure. The portions 5131 on both sides of the middle portion 5132 are each a portion which is recessed radially outward relative to a portion of the lead wire which is drawn upward as described below, and are, accordingly, hereinafter referred to as "lead wire escape portions 5131". Each lead wire escape portion 5131 is arranged to extend up to an upper end of the outer wall portion 513, thereby facilitating design of molds which are used to mold the insulator components 51. A surface of an upper portion of the outer wall portion 513 which faces the central axis J1 is slightly inclined radially outward with increasing height.

Figure 7:
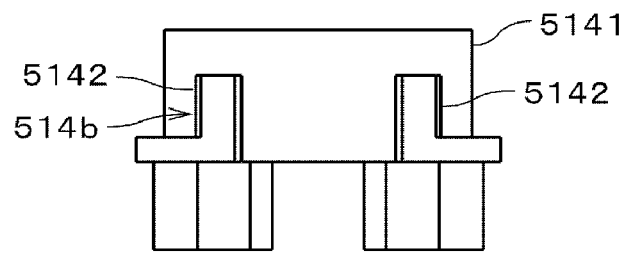
FIG. 7 is a schematic rear view of the insulator component according to a preferred embodiment of the present invention.

As illustrated in FIGS. 4, 5, and 7, the insulator component 51 further includes a wiring fixing wall portion 5141 and two wiring fixing raised portions 5142. The wiring fixing wall portion 5141 is arranged radially outward of the outer wall portion 513 to extend parallel or substantially parallel to the outer wall portion 513. Each wiring fixing raised portion 5142 is arranged radially outward of the wiring fixing wall portion 5141 to protrude upward parallel or substantially parallel to the central axis J1. The wiring fixing wall portion 5141 is arranged to hold a flat plate-shaped portion of the wiring member 121 in combination with the outer wall portion 513. A gap defined between the wiring fixing wall portion 5141 and the outer wall portion 513 will be hereinafter referred to as a "wiring fixing groove" 514*a*. In addition, the wiring member 121 is also held between the wiring fixing wall portion 5141 and the wiring fixing raised portions 5142. A gap defined between the wiring fixing wall portion 5141 and each wiring fixing raised portion 5142 will be hereinafter referred to as a "wiring fixing gap" 514*b*.

Figure 8:
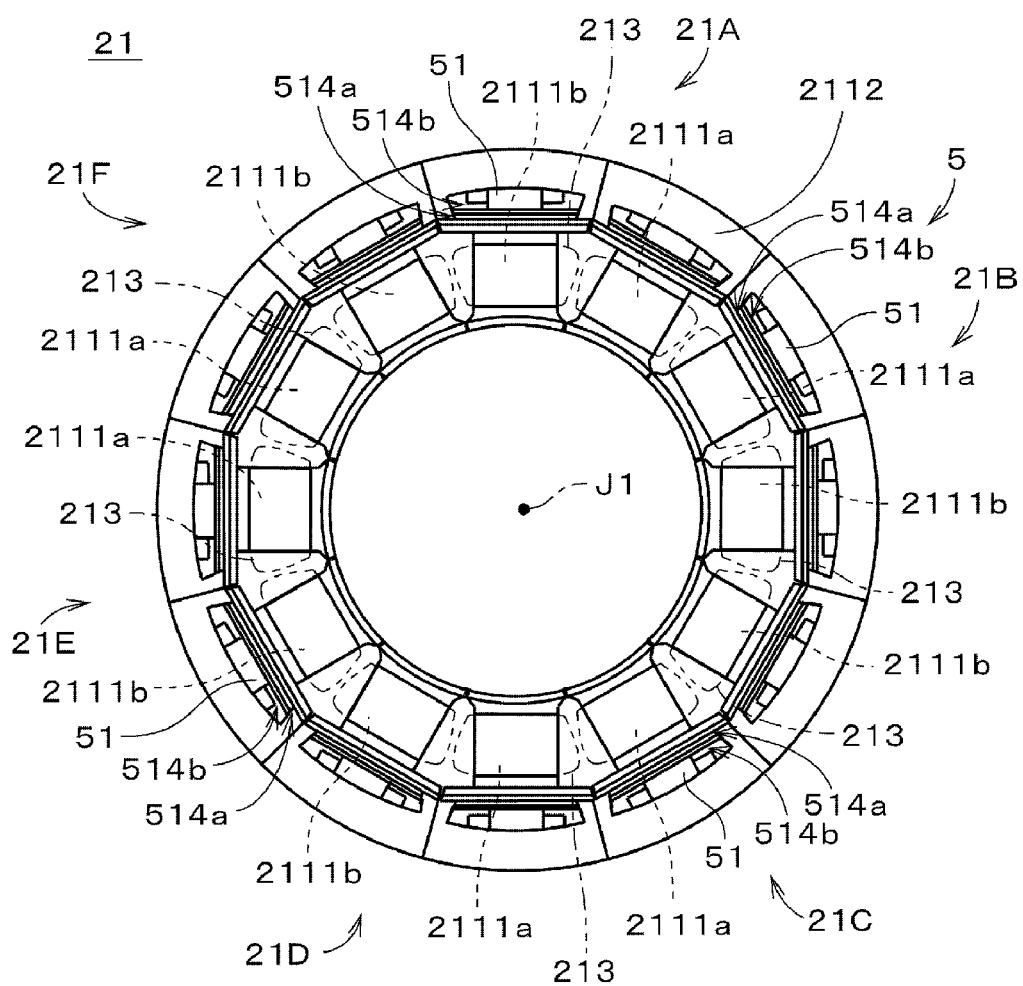
FIG. 8 is a schematic plan view of an armature according to a preferred embodiment of the present invention.
Figure 9:
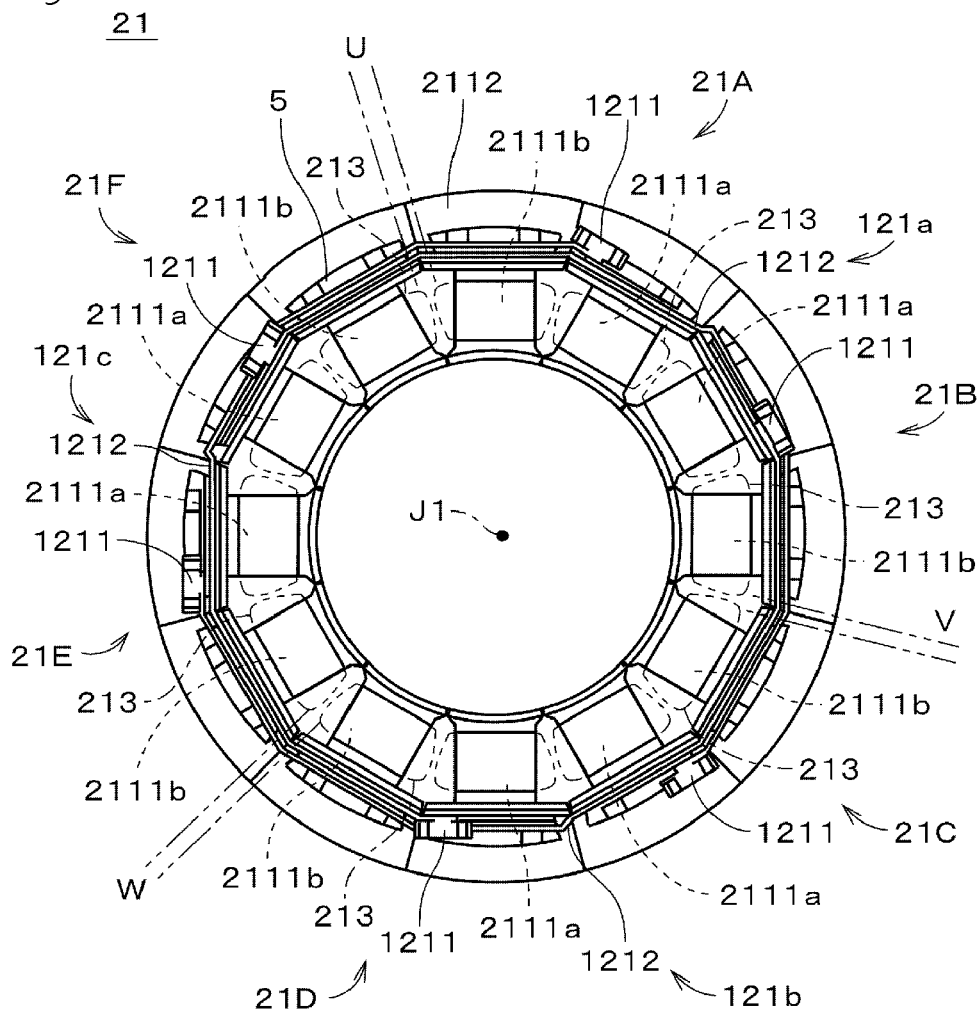
FIG. 9 is a schematic plan view of the armature according to a preferred embodiment of the present invention.

FIG. 8 is a schematic plan view of the armature 21 illustrated in FIG. 1, on which the wiring members 121 have not yet been arranged. FIG. 9 is a schematic plan view of the armature 21, on which the wiring members 121 have been arranged. Note that, in FIG. 9, the wiring members 121 are denoted by reference symbols "121*a*", "121*b*", and "121*c*". The core 211 is preferably defined by an array of, for example, twelve segment cores substantially arranged in the circumferential direction. In FIGS. 8 and 9, six split elements, each of which corresponds to a pair of adjacent segment cores, are denoted by reference symbols "21A", "21B", "21C", "21D", "21E", and "21F". The core 211 includes the teeth 2111, which are, for example, twelve in number, and a substantially annular core back 2112. The teeth 2111 are each arranged to extend in a radial direction centered on the central axis J1, and are arranged radiately around the rotor portion 3. In FIGS. 8 and 9, each of the teeth 2111 is denoted by a reference symbol "2111*a*" or "2111*b*". The core back 2112 is joined to the teeth 2111 on a side opposite to the central axis J1, whereby the teeth 2111 are magnetically connected together.

As illustrated in FIG. 8, the insulator components 51 are arranged in the circumferential direction to cover the teeth 2111, so that the wiring fixing groove 514*a* and the wiring fixing gaps 514*b* of each insulator component 51 are circumferentially aligned with the wiring fixing groove 514*a* and the wiring fixing gaps 514*b*, respectively, of each adjacent insulator component 51. As a result, on the upper surface of the armature 21, the wiring fixing grooves 514*a* and the wiring fixing gaps 514*b* are arranged in a substantially annular shape along the core back 2112. Moreover, because all the insulator components 51 that are arranged in the armature 21 share the same shape, a reduction in production costs is achieved. As illustrated by chain double-dashed lines in FIGS. 8 and 9, the lead wires are wound around the insulator components 51 between the inner wall portions and the outer wall portions to define the coils 213. The wiring fixing grooves 514*a* and the wiring fixing gaps 514*b* are therefore positioned radially outward of the coils 213.

Figure 10:
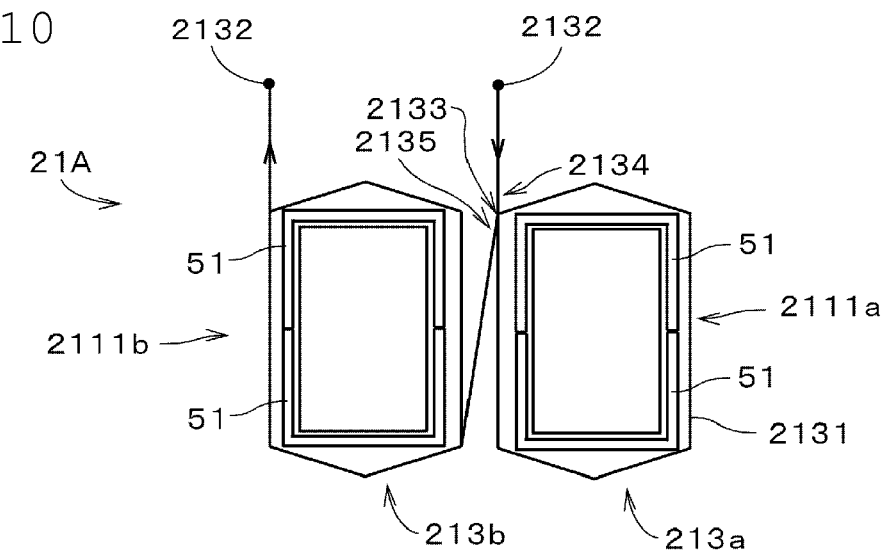
FIG. 10 is a schematic diagram illustrating the structure of a split element of the armature according to a preferred embodiment of the present invention.

The six split elements 21A to 21F which define the armature 21 preferably have substantially the same structure. As illustrated in FIG. 8, each of the split elements 21A to 21F includes two adjacent teeth 2111*a* and 2111*b*. FIG. 10 is a schematic diagram of the split element 21A as viewed from the direction of the central axis J1. In FIG. 10, a lead wire 2131 which is wound continuously around the two teeth 2111*a* and 2111*b* is represented by a broken line. In the following description, the tooth 2111*a* on the right-hand side and the tooth 2111*b* on the left-hand side in FIG. 10 will be referred to as a "first tooth" and a "second tooth", respectively. Moreover, the coil defined by a portion of the lead wire 2131 wound around the insulator components 51 covering the first tooth 2111*a* will be referred to as a "first coil 213*a*", whereas the coil defined by a portion of the lead wire 2131 wound around the insulator components 51 covering the second tooth 2111*b* will be referred to as a "second coil 213*b*".

The first coil 213*a* is defined by winding a portion of the lead wire 2131 around the insulator components 51 covering the first tooth 2111*a*. The second coil 213*b* is defined by winding a continuous portion of the lead wire 2131 around the insulator components 51 covering the second tooth 2111*b* in a direction opposite to that in which the aforementioned portion of the lead wire 2131 is wound to define the first coil 213*a*. In the present preferred embodiment, the first coil 213*a* is defined by winding the lead wire 2131 in a counterclockwise direction as viewed from the direction of the central axis J1, while the second coil 213*b* is defined by winding the lead wire 2131 in a clockwise direction as viewed from the direction of the central axis J1. Both a lead wire end portion 2132 of the lead wire 2131 on the side of the first coil 213*a* and a lead wire end portion 2132 of the lead wire 2131 on the side of the second coil 213*b* are drawn upward.

The coils 213*a* and 213*b* in each of the split elements 21C and 21E, out of the six split elements 21A to 21F, are preferably defined in the same manner as those in the split element 21A illustrated in FIG. 10. Each of the split elements 21B, 21D, and 21F is structurally reversed left to right relative to the split element 21A. That is, when viewed from the direction of the central axis J1, the second tooth 2111*b* and the second coil 213*b* are positioned on the right-hand side, while the first tooth 2111*a* and the first coil 213*a* are positioned on the left-hand side. Since the split elements 21A to 21F are arranged in a substantially annular shape, as illustrated in FIG. 8, every two first teeth 2111*a* and every two second teeth 2111*b* are arranged alternately with each other in the circumferential direction.

As illustrated in FIG. 9, a UV phase wiring member 121*a*, a VW phase wiring member 121*b*, and a WU phase wiring member 121*c*, each of which is made of an electrically conductive material, are arranged on the upper surface of the armature 21. Each of the UV phase wiring member 121*a*, the VW phase wiring member 121*b*, and the WU phase wiring member 121*c* includes two connection terminals 1211 arranged at both ends thereof. The two connection terminals 1211 are joined to each other through a substantially flat plate-shaped arm portion 1212 extending substantially in the circumferential direction and parallel or substantially parallel to the central axis J1, and are positioned radially outward of the arm portion 1212. Each wiring member 121 is arranged in contact with radially outer surfaces of the outer wall portions 513. Moreover, each wiring member 121 is arranged within the wiring fixing grooves 514*a* such that the thickness direction of the arm portion 1212 thereof is oriented in the radial direction.

One of the connection terminals 1211 of the UV phase wiring member 121*a* is arranged on the first tooth 2111*a* in the split element 21C, while the other connection terminal 1211 thereof is arranged on the first tooth 2111*a* in the split element 21F. One of the connection terminals 1211 of the VW phase wiring member 121*b* is arranged on the first tooth 2111*a* in the split element 21E, while the other connection terminal 1211 thereof is arranged on the first tooth 2111*a* in the split element 21B. One of the connection terminals 1211 of the WU phase wiring member 121*c* is arranged on the first tooth 2111*a* in the split element 21A, while the other connection terminal 1211 is arranged on the first tooth 2111*a* in the split element 21D.

Figure 11:
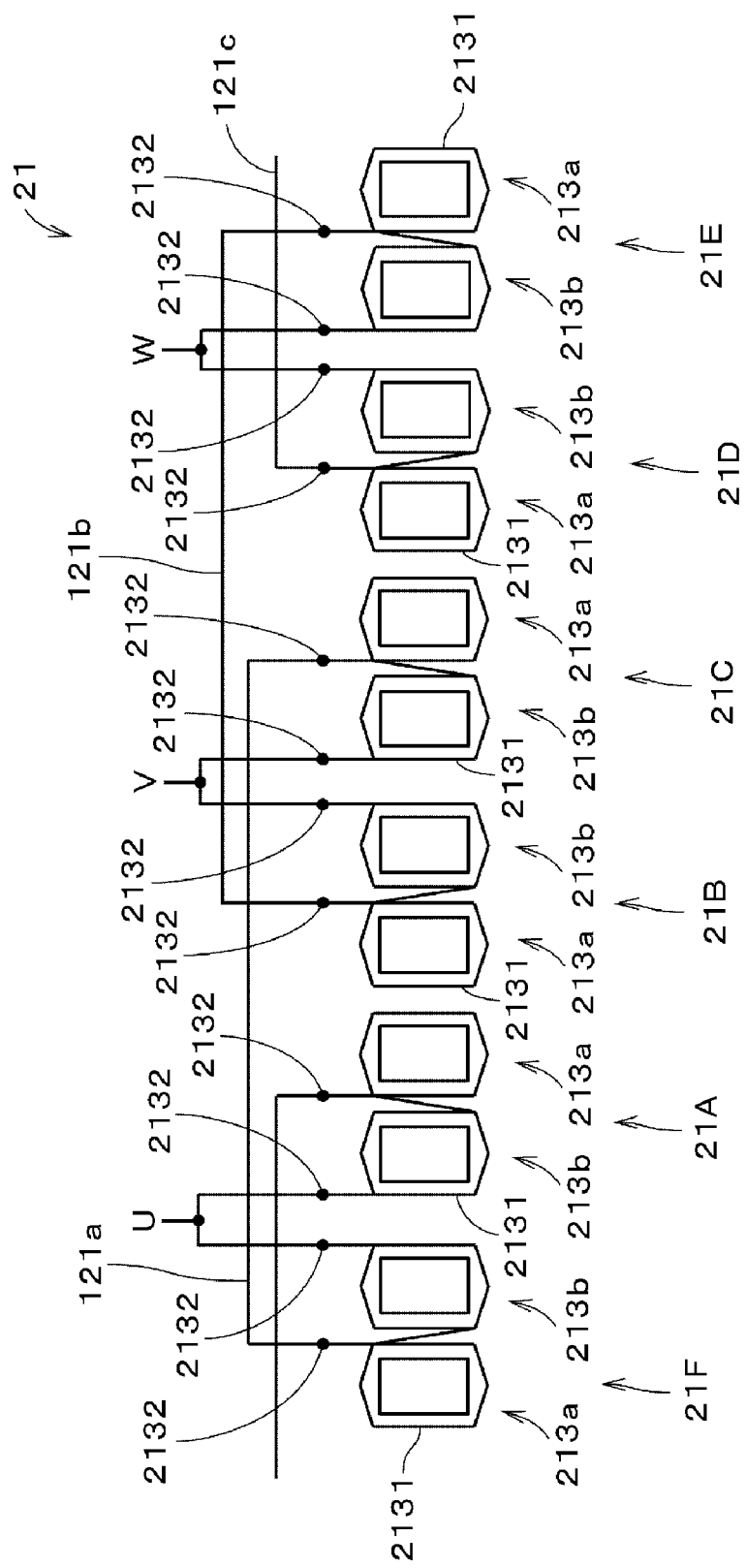
FIG. 11 is a schematic diagram illustrating the wiring configuration of the armature according to a preferred embodiment of the present invention.

FIG. 11 is a schematic diagram illustrating the wiring configuration of the armature 21. In FIG. 11, the lead wires 2131 defining the first and second coils 213a and 213b, and the wiring members 121a, 121b, and 121c, are represented by broken lines. As illustrated in FIG. 11, two ends of the UV phase wiring member 121a are connected to the lead wire end portions 2132 positioned above the first coils 213a in the split elements 21C and 21F. Two ends of the VW phase wiring member 121b are connected to the lead wire end portions 2132 positioned above the first coils 213a in the split elements 21E and 21B. Two ends of the WU phase wiring member 121c are connected to the lead wire end portions 2132 positioned above the first coils 213a in the split elements 21A and 21D.

Furthermore, the lead wire end portions 2132 of the lead wires 2131 drawn from the second coils 213b in the split elements 21A and 21F are connected to a U-phase terminal on the busbar unit 11. Notice that, in FIG. 9, two chain double-dashed lines leading to the symbol "U" represent the connection of the lead wires 2131 to the busbar unit 11. Similarly, the lead wire end portions 2132 from the second coils 213b in the split elements 21B and 21C are connected to a V-phase terminal on the busbar unit 11. Also, the lead wire end portions 2132 of the lead wires 2131 in the split elements 21D and 21E are connected to a W-phase terminal on the busbar unit 11. Three-phase currents having a phase difference of 120 degrees therebetween are thus supplied from the external power supply to the armature 21 through the busbar unit 11. A group of the coils included in the split elements 21F and 21C together form a U-V coil group, a group of the coils included in the split elements 21B and 21E together form a V-W coil group, and a group of the coils included in the split elements 21A and 21D together form a W-U coil group.

The first and second coils 213a and 213b in each of the split elements 21A, 21C, and 21E are preferably formed in the following manner. As illustrated in FIG. 10, the winding of the lead wire 2131 is started at the lead wire end portion 2132 on the side of the first coil 213a. The lead wire 2131 is wound around the insulator components 51 in the counterclockwise direction, proceeding from radially outward to radially inward, to form a first layer. Once the winding of the lead wire 2131 reaches the inner wall portions 512, the winding of the lead wire 2131 next proceeds from radially inward to radially outward to form a second layer upon the first. As a result, the first coil 213a has a two-layer structure. The winding of the lead wire 2131 is carried out such that a radially outer end portion of the first coil 213a is arranged radially in contact with the middle portions 5132 of the outer wall portions 513 of the insulator components 51, whereby a loosening of the winding of the lead wire 2131 is prevented.

After the first coil 213a is formed around the first tooth 2111a, the lead wire 2131 is drawn to the bottom right corner of the second tooth 2111b as illustrated in FIG. 10 to start winding thereof around the second tooth 2111b. The lead wire 2131 is wound around the second tooth 2111b in the clockwise direction, proceeding from radially outward to radially inward, to form a first layer. Once the winding of the lead wire 2131 reaches the inner wall portions 512, the winding thereof next proceeds from radially inward to radially outward to form a second layer upon the first. As a result, the second coil 213b has the two-layer structure. As a result of the first and second coils 213a and 213b being formed in the above-described manner, an intersection portion 2133 at which a winding start portion 2134, at which the winding for the first coil 213a starts, and a winding end portion 2135, at which the winding for the first coil 213a ends, intersect with each other in the radial direction is defined near the upper left corner of the first coil 213a.

After the coils 213 are formed, the split elements 21A to 21F are assembled together to assume a substantially annular shape. In addition, as illustrated in FIG. 9, the wiring members 121 are arranged on the insulator 5. The connection terminal 1211 in each of the split elements 21A, 21C, and 21E is positioned to the left of the first tooth 2111a when viewed from the direction of the central axis J1. The lead wire end portion 2132 on the side of each first coil 213a is drawn upward and radially outward from the first tooth 2111a to be connected to the connection terminal 1211. Moreover, the busbar unit 11 is attached onto the armature 21, and the lead wire end portion 2132 on the side of each second coil 213b is connected to the terminal of the appropriate phase on the busbar unit 11.

Figure 12:
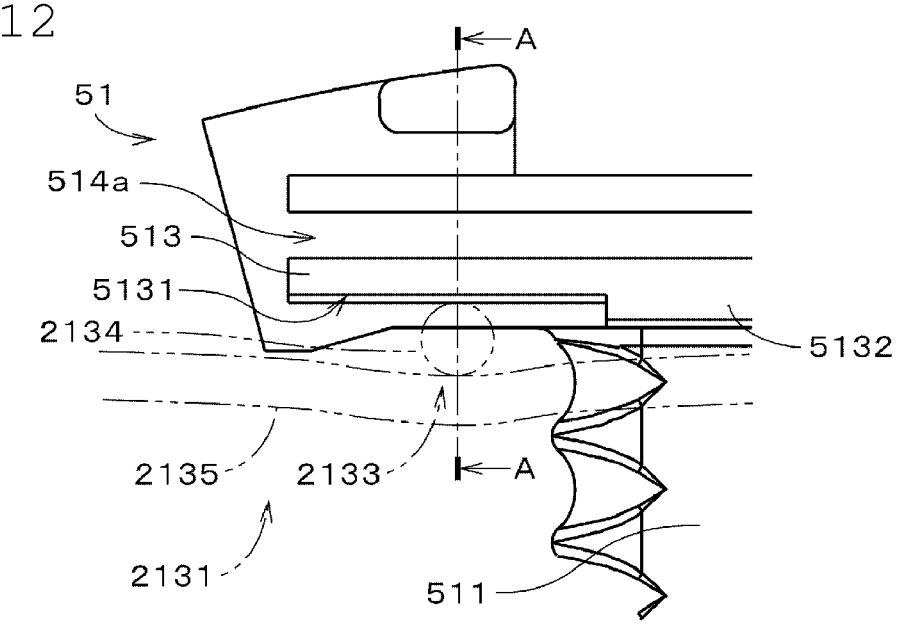
FIG. 12 is a schematic view of an intersection portion and its vicinity in the armature according to a preferred embodiment of the present invention.
Figure 13:
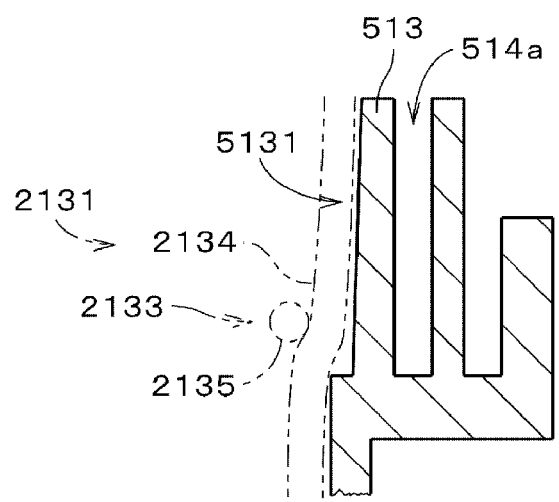
FIG. 13 is a schematic cross-sectional view illustrating a lead wire escape portion of the insulator component according to a preferred embodiment of the present invention.

FIG. 12 is an enlarged schematic view of the intersection portion 2133 and its vicinity in the insulator component 51 on the first tooth 2111a. FIG. 13 is a schematic diagram illustrating a cross-section of the insulator component 51 taken along a line indicated by arrows A in FIG. 12. In FIGS. 12 and 13, the lead wire 2131 is represented by chain double-dashed lines. As illustrated in FIGS. 12 and 13, at the intersection portion 2133, the winding end portion 2135 is arranged in contact with the winding start portion 2134, with the winding end portion 2135 positioned closer to the central axis J1 than the winding start portion 2134, which is arranged to extend substantially parallel to the central axis J1. The winding end portion 2135 is drawn toward a winding start position of the second tooth 2111b with a predetermined amount of tension in order to prevent a loosening of the winding of the first coil 213a. Note here that the winding start position of the second tooth 2111b refers to a corner on the radial outside and the bottom right of the second coil 213b as illustrated in FIG. 10. As a result, at the intersection portion 2133, the winding start portion 2134 is pressed radially outward by the winding end portion 2135.

Meanwhile, the lead wire escape portion 5131 is provided at a portion of the outer wall portion 513 which overlaps with the intersection portion 2133 in the radial direction. As described above, the lead wire escape portion 5131 is positioned radially outward relative to the middle portion 5132 of the outer wall portion 513, and the radially outer end portion of the first coil 213a is arranged in contact with the middle portion 5132. The lead wire escape portion 5131 is therefore spaced radially outward from the first coil 213a. This contributes to preventing the winding start portion 2134 from being brought into contact with the outer wall portion 513, or preventing the winding start portion 2134 from being strongly pressed against the outer wall portion 513, even if the winding start portion 2134 is bent radially outward because of the pressure from the winding end portion 2135. This contributes to preventing a deformation of the outer wall portion 513 from narrowing the wiring fixing groove 514a so greatly as to make it difficult to arrange the wiring members 121 on the insulator 5.

Note that, in the case where the connection terminals 1211 are arranged radially outward of the outer wall portions 513 as illustrated in FIG. 9, there is a relatively high probability that the winding start portion 2134 at the intersection portion 2133 will be brought into contact with the outer wall portion 513. The insulator 5 provided with the lead wire escape portions 5131 is, therefore, particularly suitable for use with an armature having such a structure. Because the lead wire escape portions 5131 are defined on both sides of the middle portion 5132, the insulator 5 can be defined by using only a single type of insulator components 51, without the need to consider the positions of the intersection portions 2133.

Figure 14:
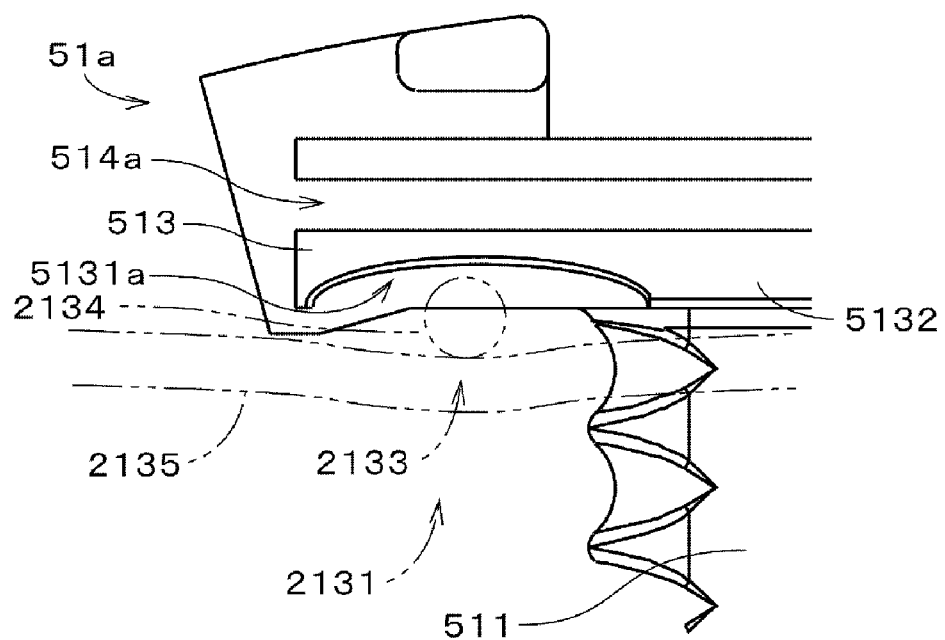
FIG. 14 is a schematic view of an intersection portion and its vicinity in an example variation of the insulator according to a preferred embodiment of the present invention.

FIG. 14 is an enlarged schematic view of the intersection portion 2133 of the lead wire 2131 and its vicinity in an insulator component 51a according to another preferred embodiment of the present invention. Lead wire escape portions 5131a of the outer wall portion 513 of the insulator component 51a illustrated in FIG. 14 are different from the lead wire escape portions 5131 of the insulator component 51 illustrated in FIG. 12 in that each lead wire escape portion 5131a has a cylindrical surface extending parallel or substantially parallel to the central axis J1. The insulator component 51a is otherwise similar in structure to the insulator component 51. The lead wire escape portions 5131a are defined on both sides, substantially in the circumferential direction, of the middle portion 5132 of the outer wall portion 513 of the insulator component 51a. Each lead wire escape portion 5131a is arranged to extend up to the upper end of the outer wall portion 513 in order to simplify a mold design. Moreover, surfaces of the middle portion 5132 and the lead wire escape portions 5131a which face the central axis J1 are slightly inclined in a radially outward direction with an increasing height.

The intersection portion 2133 of the lead wire 2131 is defined at a position that overlaps with one of the lead wire escape portions 5131a in the radial direction during formation of the coil. At the intersection portion 2133, the winding start portion 2134 is pressed radially outward by the winding end portion 2135. The lead wire escape portion 5131a is, however, spaced radially outward from the radially outer end portion of the coil, which is arranged in contact with the middle portion 5132. This contributes to preventing the winding start portion 2134 from being brought into contact with the outer wall portion 513, or preventing the winding start portion 2134 from being strongly pressed against the outer wall portion 513, even if the winding start portion 2134 is bent radially outward. This contributes to preventing a deformation of the outer wall portion 513 from narrowing the wiring fixing groove 514a so greatly as to make it difficult to arrange the wiring members 121 on the insulator 5.

While preferred embodiments of the present invention have been described above, the present invention is not limited to the above-described preferred embodiments. Various variations and modifications are possible without departing from the scope and spirit of the present invention.

For example, the shape of each of the lead wire escape portions 5131 and 5131a of the insulator components 51 and 51a is not limited to a flat surface or a cylindrical surface parallel or substantially parallel to the central axis J1. The shape of each of the lead wire escape portions 5131 and 5131a may be varied, as long as it is spaced radially outward from the coil 213 so as to prevent a deformation of the outer wall portion 513. For example, the lead wire escape portion may be a recess or a groove recessed radially outward which is defined at a portion of the outer wall portion 513 which is positioned opposite the intersection portion 2133. Also note that the lead wire escape portions may be defined either on both sides of the middle of the outer wall portion 513 substantially in the circumferential direction, or on only one side thereof which is positioned opposite the intersection portion 2133.

Also note that the shape of the wiring fixing wall portion 5141 is not limited to a wall shape. The wiring fixing wall portion may be defined by a plurality of upward projections. The insulator 5 may be defined by a combination of a plurality of insulator components 51 joined together.

Also note that the lead wire 2131 may be wound in a different procedure to define the coils 213 from that illustrated in FIG. 10, as long as the winding method applied involves formation of the intersection portion 2133, at which a radially outward force is applied to a portion of the lead wire 2131, in the vicinity of the upper portion of the outer wall portion 513. For example, the lead wire 2131 may be wound around the first and second teeth 2111a and 2111b both in the counterclockwise direction. Furthermore, even in the cases where the lead wire 2131 is wound continuously around three or more teeth 2111 to define coils, or where each coil is independently defined around a separate one of the teeth 2111, the insulator components 51 may be used as long as any intersection portion 2133 is provided. Also note that the intersection portion 2133 may be provided for only one tooth 2111 in the armature 21, and that the intersection portions 2133 may be provided for all the teeth 2111 in the armature 21.

Note that each wiring member 121 may not necessarily be defined by a flat plate-shaped electrically conductive metal sheet. For example, lead wires may be drawn on and held in the wiring fixing grooves 514a of the insulator components 51 to function as the wiring members. Even in this case, the provision of each lead wire escape portion 5131 prevents the winding start portion 2134 for the coil from being pressed radially outward at the intersection portion 2133 so as to deform the outer wall portion 513, and thereby makes it easy to arrange the lead wires on the wiring fixing grooves 514a.

A star configuration or other configurations may be adopted as the wiring configuration of the armature 21. The motor 1 may be replaced with an induction motor without use of the field magnet 33 in the rotor portion 3.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An electric motor comprising:
    a stator portion including an annular armature;
    a rotor portion arranged to be inserted inside the armature; and
    a bearing mechanism arranged to support the rotor portion such that the rotor portion is rotatable about a central axis of the armature with respect to the stator portion;
    wherein
    the armature includes:
        a core including a plurality of teeth arranged circumferentially around the rotor portion, and a core back arranged to magnetically connect radially outer ends of the teeth to one another;
        an insulator arranged to cover the teeth;
        a plurality of coils each defined by a lead wire wound around a separate one of the teeth with the insulator provided therebetween; and
        a wiring member arranged on the insulator and connected to the lead wire;
    with respect to at least one of the teeth, a winding start portion and a winding end portion of the lead wire are arranged to intersect with each other in a radial direction centered on the central axis to define an intersection portion;
    the insulator includes a wall portion arranged to project in a direction substantially parallel to the central axis, and extending substantially in a circumferential direction centered on the central axis so as to be in contact with a radially outer end of the coil;

the intersection portion and the wall portion are arranged to overlap with each other in the radial direction, while the wiring member is arranged in contact with an outside of the wall portion; and the wall portion includes a lead wire escape portion spaced radially outward from the coil and arranged at a position where the wall portion and the intersection portion overlap with each other in the radial direction.

2. The motor according to claim 1, wherein the wiring member includes a flat plate-shaped portion parallel or substantially parallel to the central axis and extending substantially in the circumferential direction; and the insulator includes a wiring fixing portion arranged to hold the flat plate-shaped portion in combination with the wall portion.

3. The motor according to claim 2, wherein the wiring member includes a terminal connected to the lead wire, the terminal being positioned radially outward of the flat plate-shaped portion.

4. The motor according to claim 1, wherein the lead wire is wound continuously around two adjacent ones of the teeth, and, with respect to at least one of the coils on the two adjacent teeth, the winding start portion and the winding end portion of the lead wire are arranged to define the intersection portion.

5. The motor according to claim 1, wherein a middle portion of the wall portion provided substantially in the circumferential direction are arranged in contact with the coil in the radial direction, and the lead wire escape portion is provided on each side of the middle portion substantially in the circumferential direction.

6. The motor according to claim 1, wherein the lead wire escape portion of the wall portion is arranged to extend up to an end of the wall portion in the direction parallel or substantially parallel to the central axis.

* * * * *